(12) United States Patent
Buehler et al.

(10) Patent No.: US 10,884,731 B2
(45) Date of Patent: *Jan. 5, 2021

(54) ADAPTABLE MANAGEMENT OF WEB APPLICATION STATE IN A MICRO-SERVICE ARCHITECTURE

(71) Applicant: INTERNATIONAL BUSINESS MACHINES CORPORATION, Armonk, NY (US)

(72) Inventors: Dieter Buehler, Tuebingen (DE); Matthias Falkenberg, Stuttgart (DE); Armelle Parfaite Gaha Tchamabe, Boeblingen (DE); Nedim Karaoguz, Stuttgart (DE); Thomas Steinheber, Maihingen (DE)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/371,614

(22) Filed: Apr. 1, 2019

(65) Prior Publication Data

US 2019/0227792 A1    Jul. 25, 2019

Related U.S. Application Data

(63) Continuation of application No. 15/707,354, filed on Sep. 18, 2017, now Pat. No. 10,275,235.

(51) Int. Cl.
*G06F 8/70* (2018.01)
*G06F 9/50* (2006.01)
(Continued)

(52) U.S. Cl.
CPC ............. *G06F 8/70* (2013.01); *G06F 9/5072* (2013.01); *H04L 41/0803* (2013.01);
(Continued)

(58) Field of Classification Search
None
See application file for complete search history.

(56) References Cited

U.S. PATENT DOCUMENTS

| 6,857,120 B1 | 2/2005 | Arnold |
| 7,870,352 B2 * | 1/2011 | Stalker ................ G06F 9/44594 711/158 |

(Continued)

OTHER PUBLICATIONS

Mell et al., "The NIST Definition of Cloud Computing," National Institute of Standards and Technology, Sep. 2011, p. 1-3, Special Publication 800-145.

*Primary Examiner* — Isaac T Tecklu
(74) *Attorney, Agent, or Firm* — Alexis N. Hatzis

(57) ABSTRACT

A method for controlling a web application state in a micro-service architecture may be provided. The method loading a current state of the web application via a server-side state micro-service from a server state store upon a navigation to a website relating to a server-side micro-service of the web application. The method also comprises triggering a state change of the web application by a user interface control of the client user interface component, transmitting the changed state from the server-side micro-service of the web application to the server-side state micro-service, managing the changed state by the server-side state micro-service together with a state identifier in a server state store, transmitting the changed state and the state identifier from the server-side state micro-service to the state client, and notifying the client user interface component about the changed state.

20 Claims, 8 Drawing Sheets

(51) Int. Cl.
  *H04L 12/24* (2006.01)
  *H04L 29/12* (2006.01)
  *H04L 29/08* (2006.01)
(52) U.S. Cl.
  CPC ............ *H04L 61/308* (2013.01); *H04L 67/02* (2013.01); *H04L 61/2575* (2013.01)

(56) References Cited

U.S. PATENT DOCUMENTS

| | | | | |
|---|---|---|---|---|
| 7,953,861 | B2* | 5/2011 | Yardley | H04L 67/142 709/203 |
| 9,367,809 | B2 | 6/2016 | Puri | |
| 2002/0051541 | A1* | 5/2002 | Glick | H04L 67/02 380/258 |
| 2003/0037108 | A1* | 2/2003 | Peiffer | H04L 67/1027 709/203 |
| 2003/0110266 | A1* | 6/2003 | Rollins | H04L 67/142 709/227 |
| 2004/0104947 | A1* | 6/2004 | Schmitt | G06F 16/957 715/859 |
| 2004/0111727 | A1* | 6/2004 | Schwarzbauer | H04L 43/08 719/310 |
| 2004/0133563 | A1* | 7/2004 | Harvey | H04L 67/02 |
| 2004/0181598 | A1* | 9/2004 | Paya | G06F 16/9574 709/227 |
| 2005/0097533 | A1 | 5/2005 | Chakrabarti | |
| 2006/0106802 | A1* | 5/2006 | Giblin | H04L 9/00 |
| 2006/0291481 | A1* | 12/2006 | Kumar | H04L 29/06027 370/400 |
| 2007/0101008 | A1* | 5/2007 | Gomez | G06F 16/951 709/228 |
| 2008/0256612 | A1* | 10/2008 | Roy | H04L 63/08 726/5 |
| 2009/0182643 | A1 | 7/2009 | Holstein | |
| 2009/0328002 | A1 | 12/2009 | Lin | |
| 2010/0082747 | A1 | 4/2010 | Yue | |
| 2010/0083240 | A1 | 4/2010 | Siman | |
| 2010/0174773 | A1* | 7/2010 | Penner | H04L 67/06 709/203 |
| 2010/0262589 | A1* | 10/2010 | Gnech | G06F 16/955 707/695 |
| 2011/0040826 | A1* | 2/2011 | Chadzelek | H04L 67/142 709/203 |
| 2011/0258617 | A1 | 10/2011 | Park | |
| 2011/0321021 | A1 | 12/2011 | Chen | |
| 2012/0166518 | A1* | 6/2012 | Alev | H04L 67/02 709/203 |
| 2012/0278793 | A1* | 11/2012 | Jalan | G06F 11/3419 717/158 |
| 2013/0066933 | A1 | 3/2013 | Mendiratta | |
| 2013/0174127 | A1 | 7/2013 | Chen | |
| 2013/0249917 | A1 | 9/2013 | Fanning | |
| 2015/0309970 | A1* | 10/2015 | Wuellner | G06F 1/3265 715/234 |
| 2016/0124742 | A1* | 5/2016 | Rangasamy | H04L 41/0803 717/103 |
| 2016/0226736 | A1 | 8/2016 | Tran | |
| 2016/0248861 | A1* | 8/2016 | Lawson | H04L 67/32 |
| 2017/0068581 | A1 | 3/2017 | Qi | |
| 2017/0126812 | A1* | 5/2017 | Singhal | H04L 67/145 |
| 2018/0039494 | A1 | 2/2018 | Lander | |
| 2018/0077038 | A1* | 3/2018 | Leff | H04L 43/0823 |
| 2018/0081983 | A1* | 3/2018 | Carru | H04L 67/20 |
| 2018/0189118 | A1* | 7/2018 | Kaplan | G06F 9/541 |

\* cited by examiner

ADAPTABLE MANAGEMENT OF WEB APPLICATION STATE IN A MICRO-SERVICE ARCHITECTURE

BACKGROUND

The invention relates generally to a method and system for state management of an application, and more specifically, to a computer-implemented method for controlling a web application state in a micro-service architecture. The invention relates further to a system for controlling a web application state in a micro-service architecture, and a computer program product.

The usage of web interfaces and portals for consumer applications on mobile devices, as well as enterprise applications, is ever increasing. The usage of stateless user interfaces is the norm. Thus, in traditional web applications and web portal systems, the state of a given web application or set of web applications provides major challenges due to the stateless characteristics and design criteria of traditional web interfaces. This situation has led to sophisticated approaches in order to maintain a state of a web application across user sessions by, e.g., putting a representation of the web application or web portal state into the URL (universal resource locator) of the served resource.

This applies especially to those web portal solutions that aggregate multiple web applications into a single HTML (HyperText Markup Language) document with each web application requiring its own state management.

Session management in web applications usually supports the persistence of volatile information that may contribute to an actual state of the web application. This data is commonly managed by the web portal and bound to a specific user session which may be identified by an HTTP cookie and/or URL parameter.

Traditionally, the state of a web application may be represented by complex URLs that encode the state of all states for portions of all web pages of the report. These URLs are generated by the web application or web portal server which comprise a corresponding state management and respective URL generation components. Hence, web applications are responsible for managing their web application state for a given session. The session may be identified by an HTTP cookie and/or a URL parameter.

It is obvious that these approaches to solve the session management challenges have led to various drawbacks in today's state handling. The representation of web portal states in the URL have led to URLs which are complex and which a user can hardly understand or read. The vast amount of information presented in the URL state has led to the reaching of URL length limitations supported by web browsers, web proxies, web servers and the like. This will also lead to a low level of acceptance for state for the URLs, for example, when trying to share links via email with other users or using another device with another browser. The exceeded ends of the URL length limitations may also lead to storing portions of the state information in a persistence layer of the web application servers or web portals, which may thus lead to increased required computing power and amount of memory.

Furthermore, the fact that the complete state is represented in URLs in today's web portal systems may lead to the need for encoding and decoding information on the server or on the client. Once represented in a URL, the state information is valid until the web applications that are associated with this state information are retired. Other drawbacks of known solutions include a complex generation process for extended URLs, the possibility to manipulate state URLs as well as potentially or accidentally user-initiated deletions of HTTP cookies, which result in a loss of the user's web application state.

Thus, the known approaches for session or state management in web applications and/or portals have a limited appeal and clear negative characteristics.

SUMMARY

A solution for the above-mentioned situation may be represented by the subject-matters of the independent claims.

According to one aspect of the present invention, a computer-implemented method for controlling a web application state in a micro-service architecture may be provided. The method may comprise registering a client-side state client having a related client state store at a client user interface component, and loading a current state of the web application via a server-side state micro-service from a server state store, upon a navigation in the client user interface component to a website relating to a server-side micro-service of the web application indicated by a state identifier in a related universal resource locator (URL).

Additionally, the method may comprise triggering a state change of the web application by a user interface control of the client user interface component, transmitting the changed state from the server-side micro-service of the web application to the server-side state micro-service, storing the changed state by the server-side state micro-service together with a state identifier in a server state store, transmitting the changed state and the state identifier from the server-side state micro-service to the state client, and notifying the client user interface component about the changed state.

According to another aspect of the present invention, a system for controlling a web application state in a micro-service architecture computer environment may be provided. The system may comprise a client-side state client component having a related client state store, the state client being registered at a client user interface component, and a server-side micro-service component relating to the web application, the server-side micro-service component may be adapted for—upon a navigation in the client user interface component to a website relating to a server-side micro-service component of the web application indicated by a state identifier in a related universal resource locator (URL)—making available a current state of the web application via a server-side state micro-service component from a server state store.

The system may further comprise a monitoring unit adapted for detecting a state change of the web application by a user interface control of the client user interface component. The server-side micro-service component of the web application may be adapted for transmitting the changed state to the server-side state micro-service component.

Moreover, the system may comprise a server state store adapted for storing the changed state together with a state identifier controlled by the server-side state micro-service and a notification unit adapted for notifying the client user interface component about the changed state. The server-side state micro-service may be adapted for transmitting the changed state and the state identifier to the state client component.

Furthermore, embodiments may take the form of a related computer program product, accessible from a computer-usable or computer-readable medium providing program code for use by or in connection with a computer or any instruction execution system. For the purpose of this description, a computer-usable or computer-readable medium may be any apparatus that may contain means for storing, communicating, propagating or transporting the program for use, by or in connection with the instruction execution system, apparatus, or device.

BRIEF DESCRIPTION OF THE SEVERAL VIEWS OF THE DRAWINGS

It should be noted that embodiments of the invention are described with reference to different subject-matters. In particular, some embodiments are described with reference to method type claims whereas other embodiments have been described with reference to apparatus type claims. However, a person skilled in the art will gather from the above and the following description that, unless otherwise notified, in addition to any combination of features belonging to one type of subject-matter, also any combination between features relating to different subject-matters, in particular, between features of the method type claims, and features of the apparatus type claims, is considered as to be disclosed within this document.

The aspects defined above and further aspects of the present invention are apparent from the examples of embodiments to be described hereinafter and are explained with reference to the examples of embodiments, but to which the invention is not limited.

Figure 1:
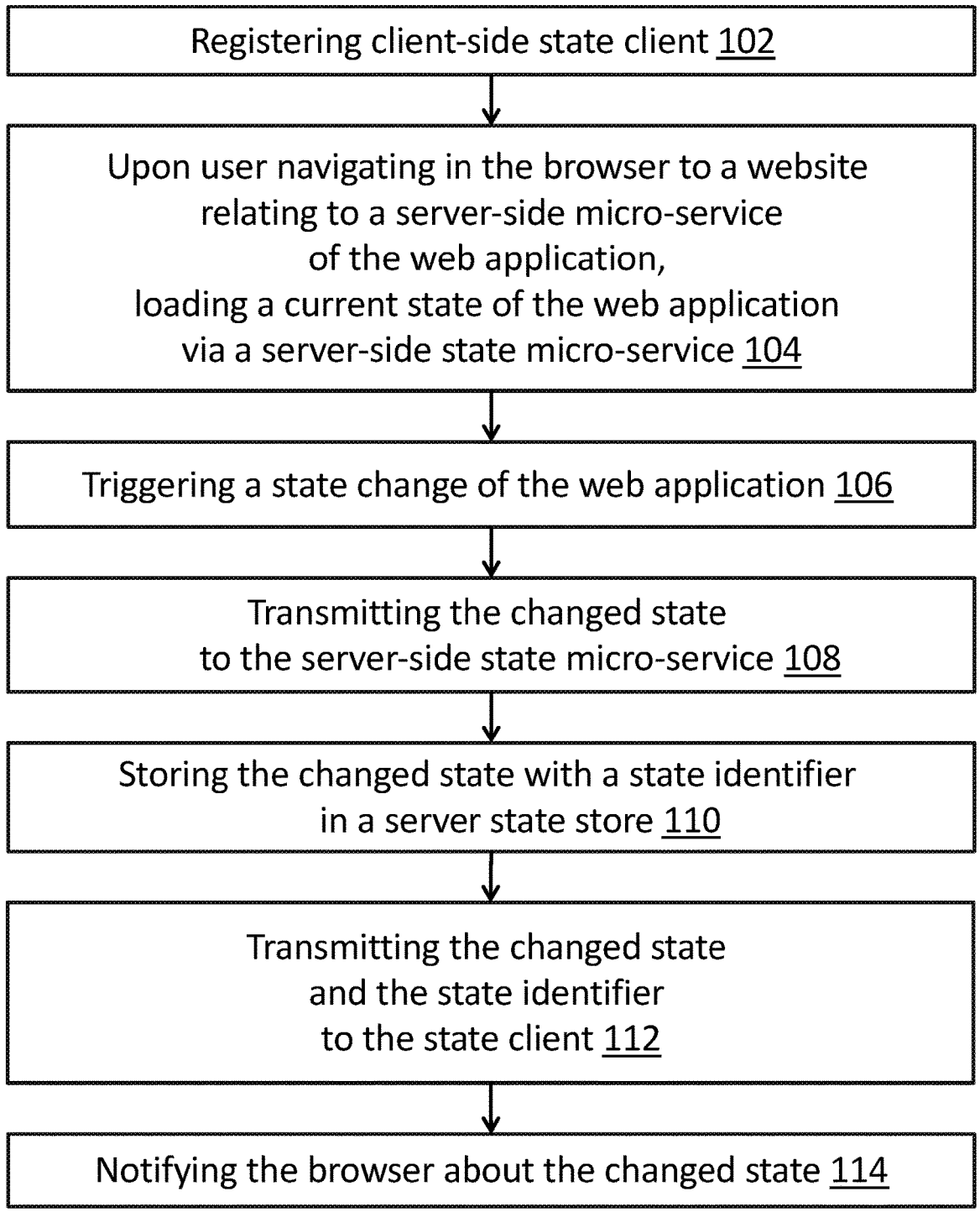

Preferred embodiments of the invention will be described, by way of example only, and with reference to the following drawings:

FIG. 1 shows a block diagram of an embodiment of the inventive computer-implemented method for controlling a web application state in a micro-service architecture.

Figure 2:
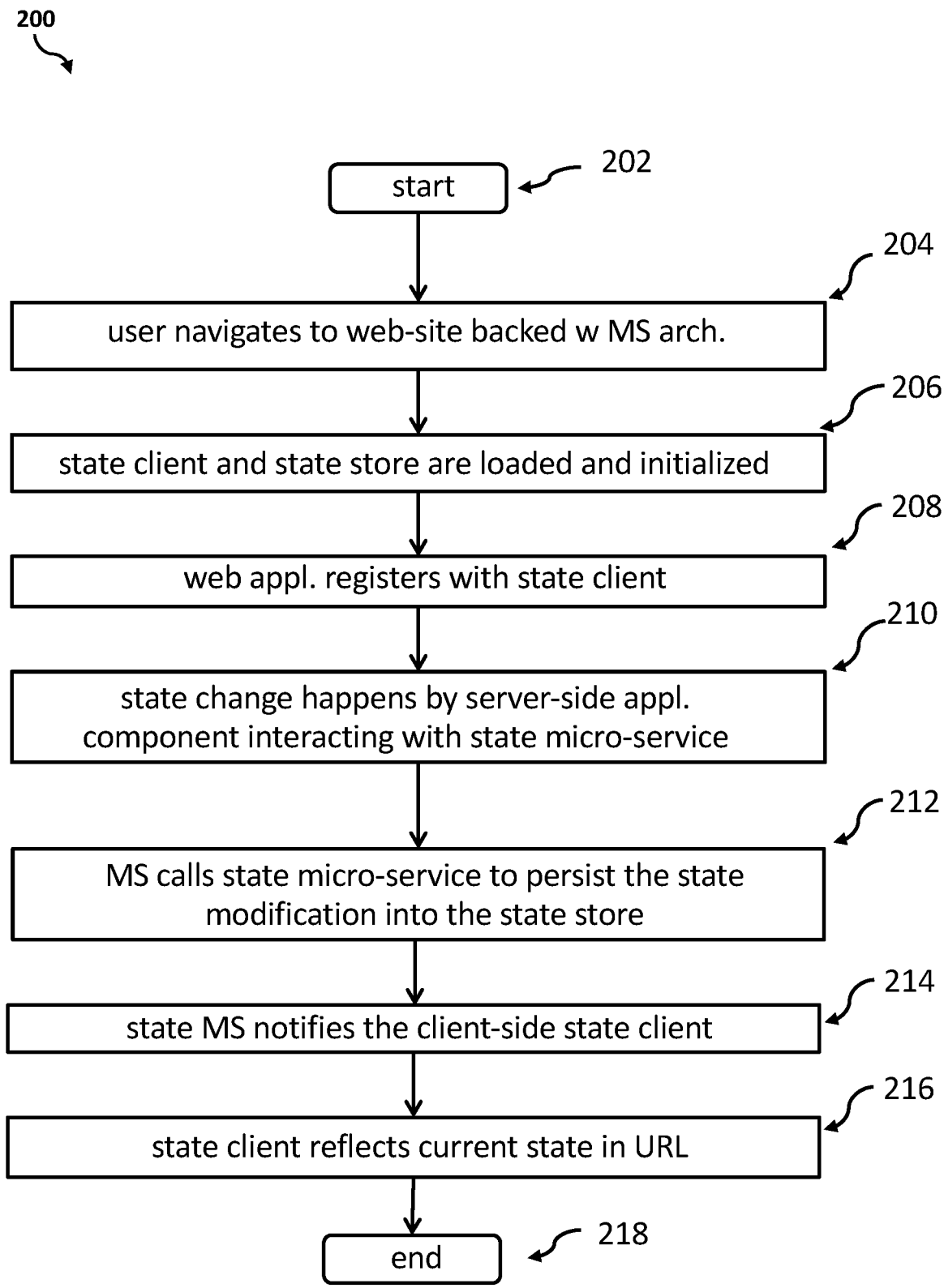

FIG. 2 shows a flowchart of an embodiment of a state persisting flow.

Figure 3:
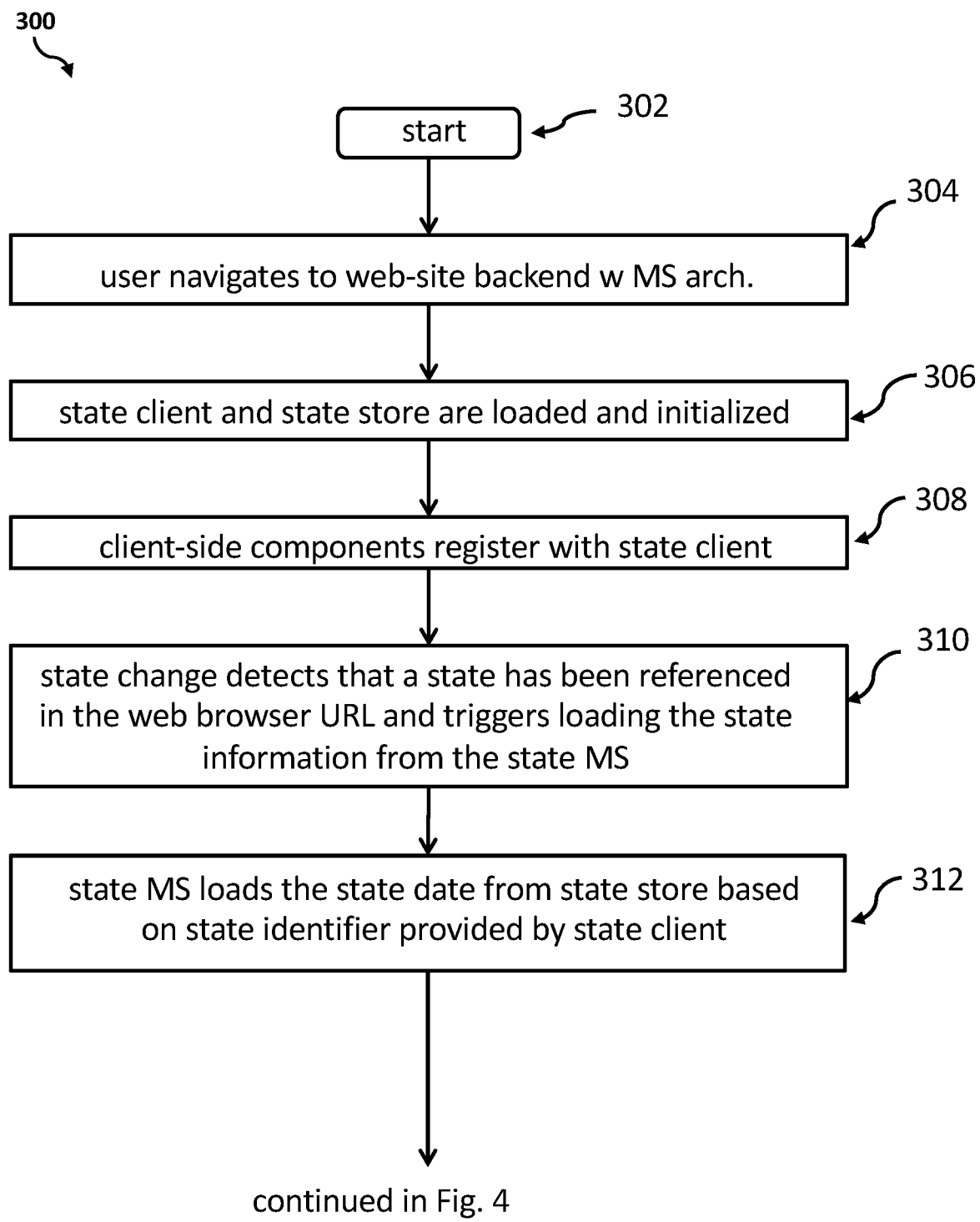

FIG. 3 shows a flowchart of an embodiment of a state loading/validation flow.

Figure 4:
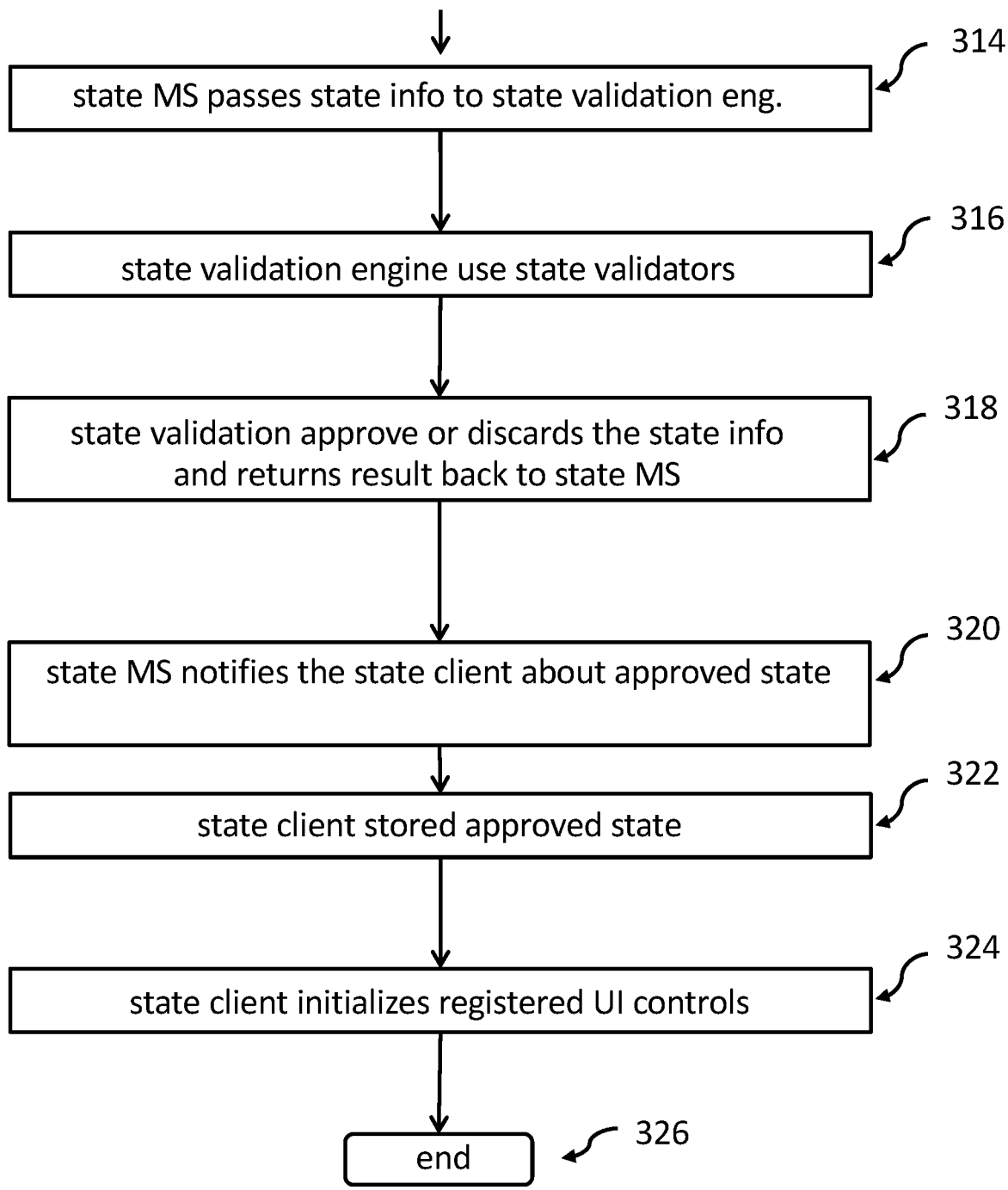

FIG. 4 shows a continuation of the flowchart of an embodiment of the state loading/validation flow according to FIG. 3.

Figure 5:
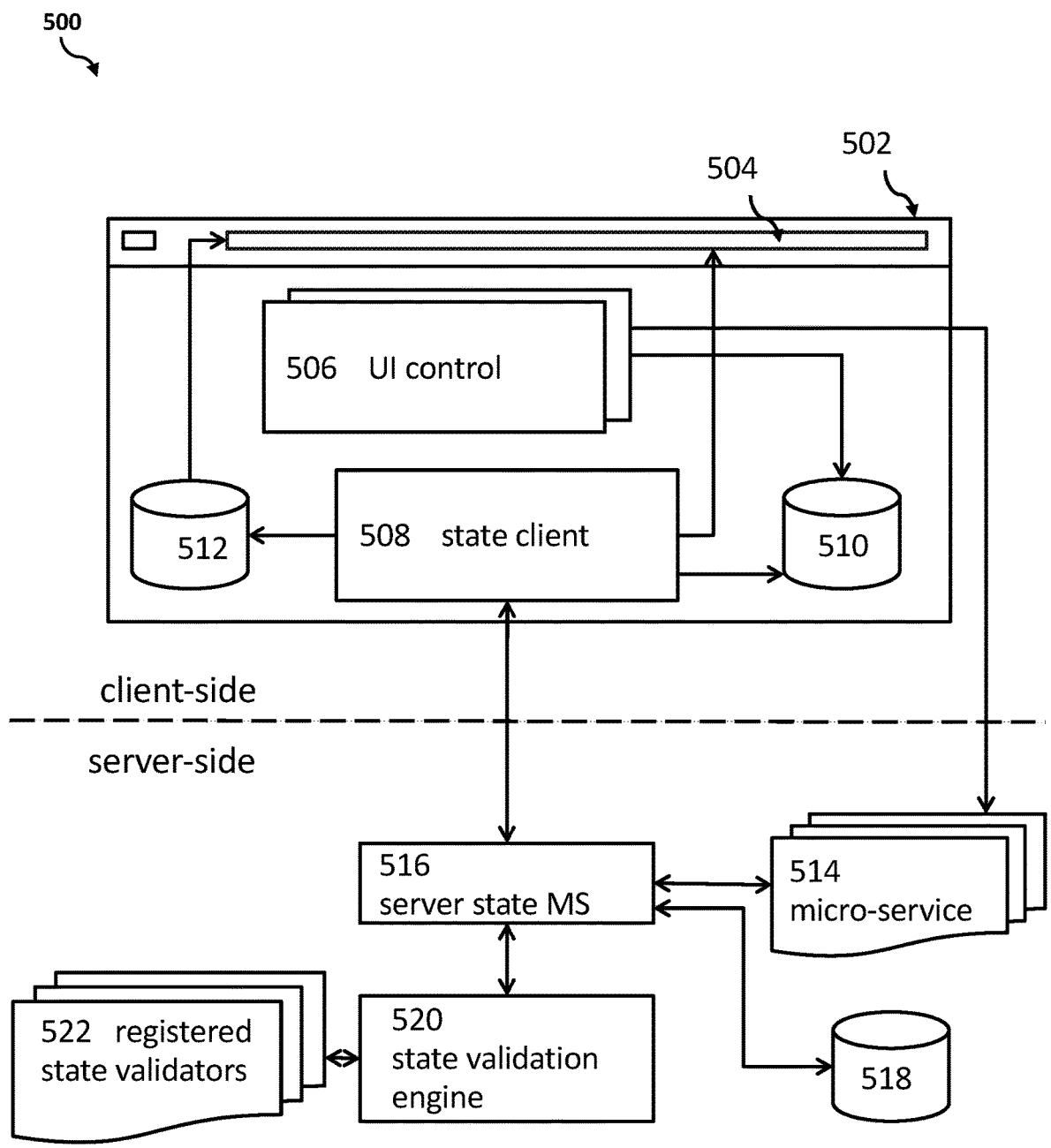

FIG. 5 shows an embodiment of substantial system components involved in executing the proposed method.

Figure 6:
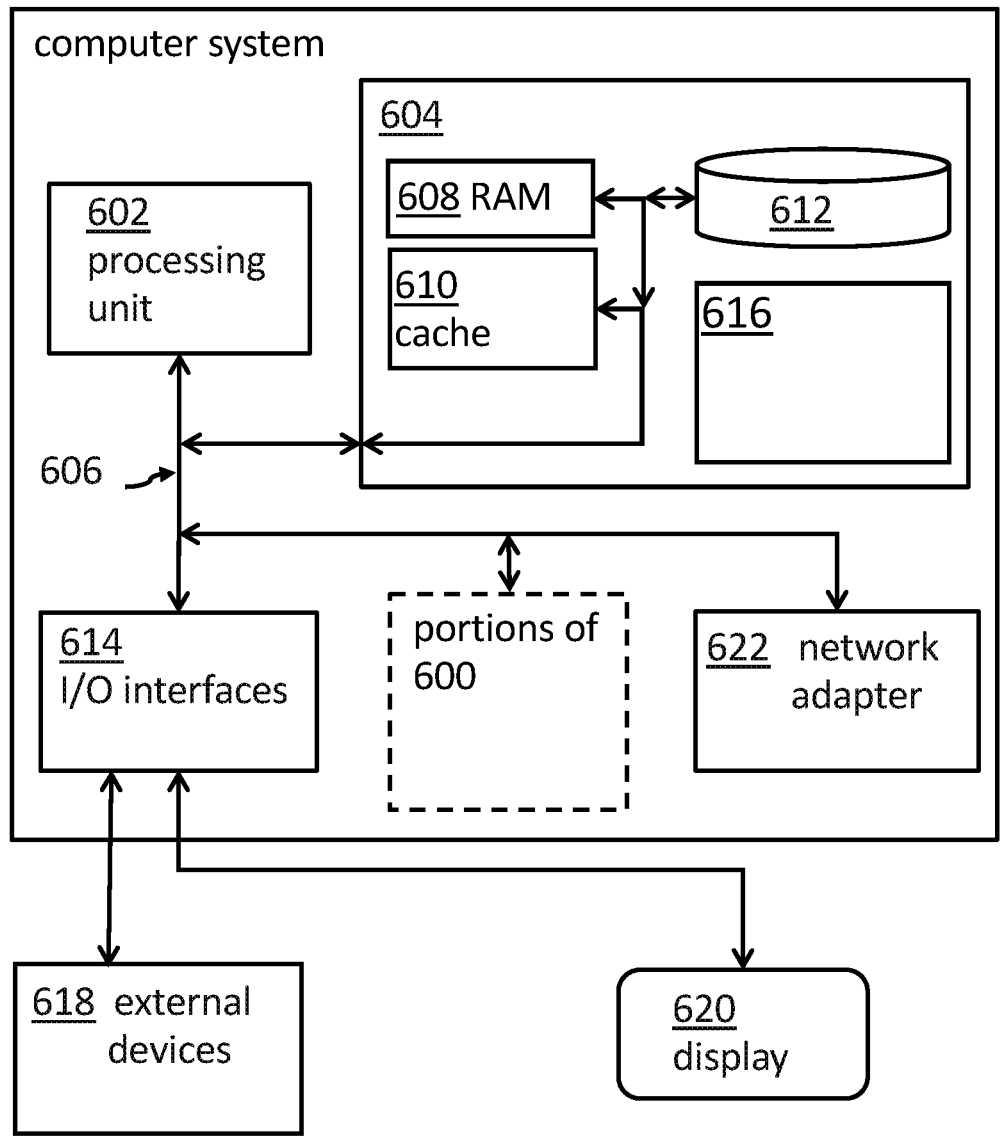

FIG. 6 shows an embodiment of a computing system comprising at least portions of the system components of FIG. 5.

Figure 7:
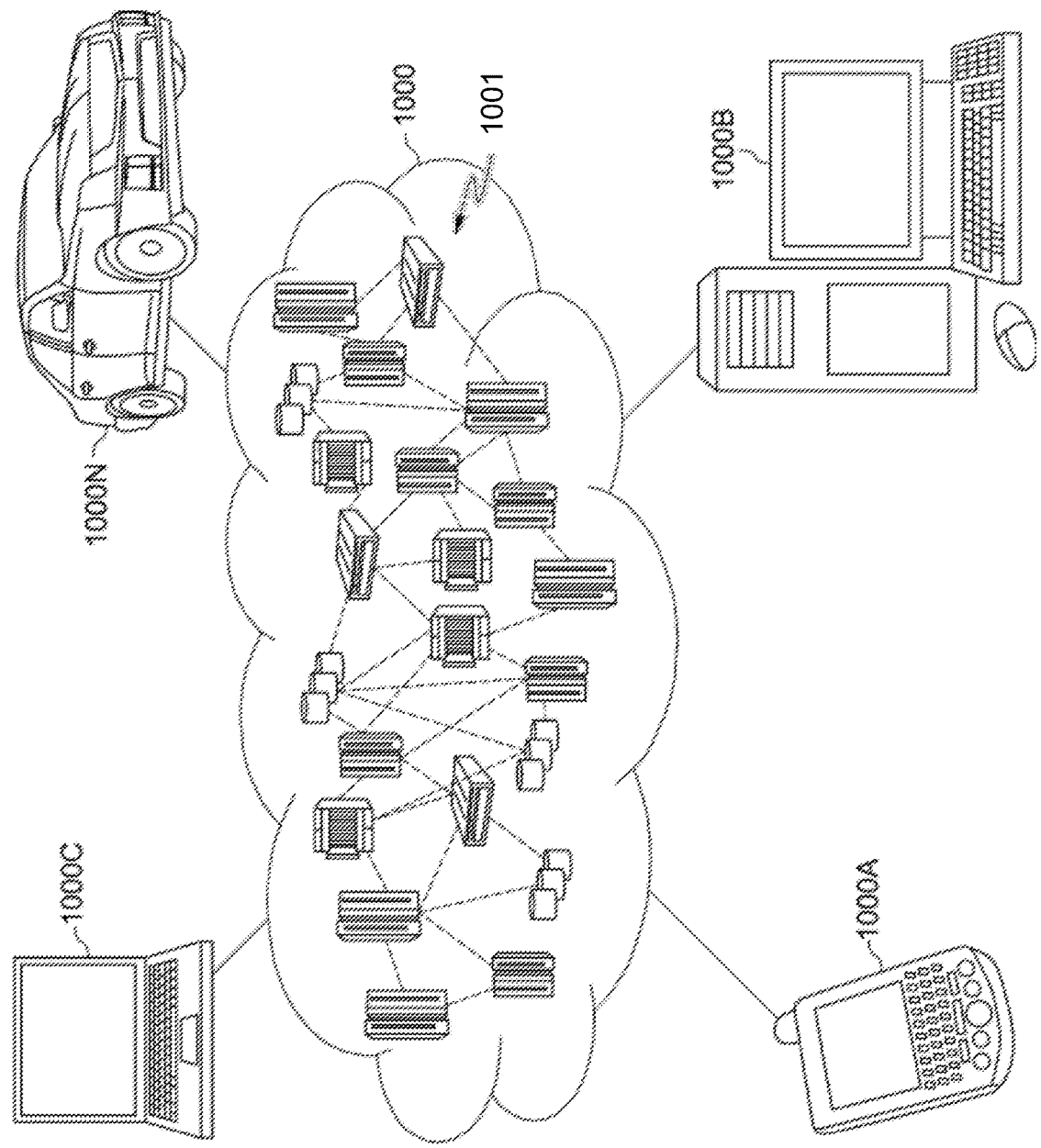

FIG. 7 is a block diagram of an illustrative cloud computing environment.

Figure 8:
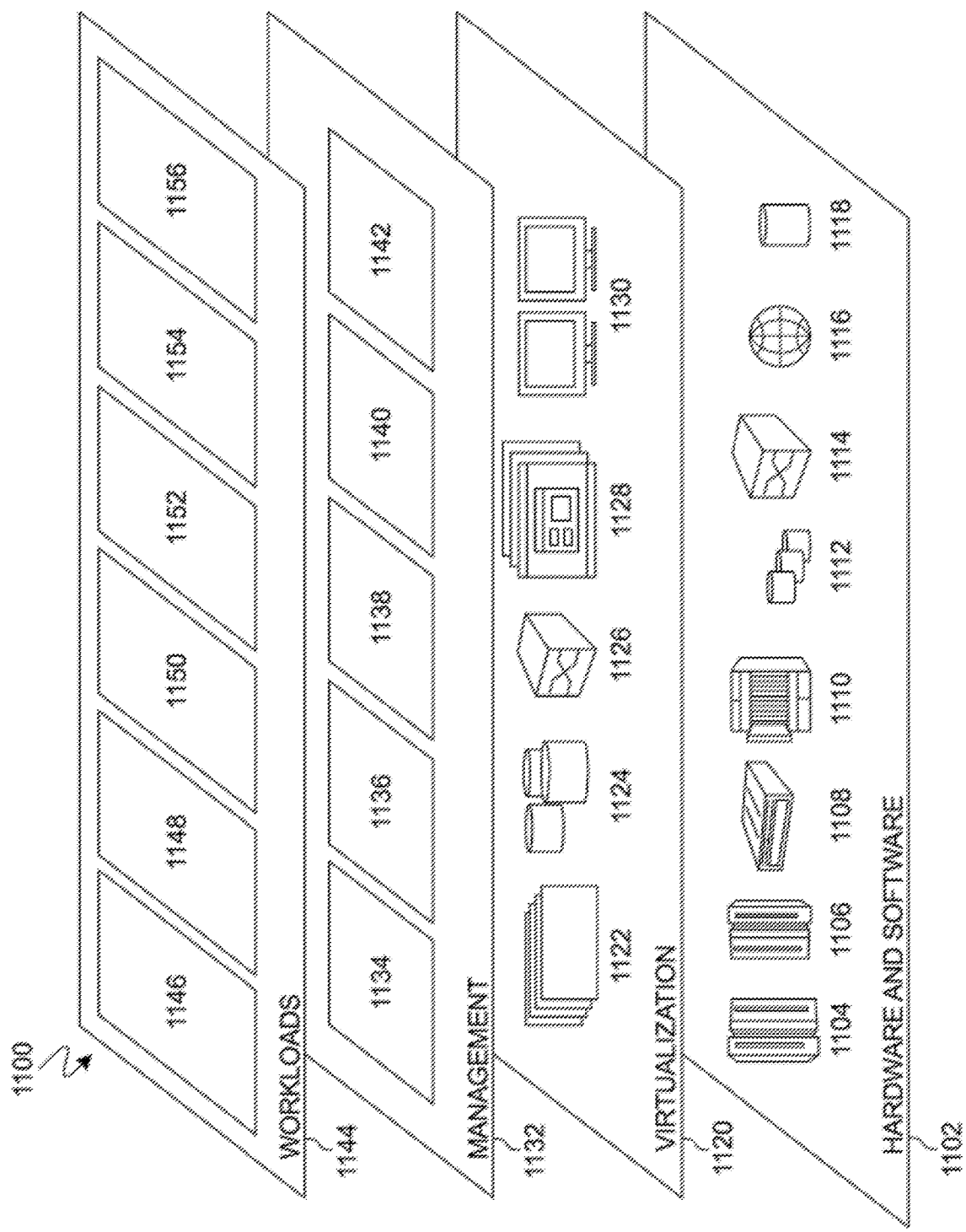

FIG. 8 is a block diagram of functional layers of the illustrative cloud computing environment of FIG. 7.

DETAILED DESCRIPTION

In the context of this description, the following conventions, terms and/or expressions may be used:

The term 'web application state' or in short 'state' may denote a status of a transaction in the context of a transactional application, e.g., a web shop application. The state may be represented by the content of a shopping cart of a user of the web shop. Thus, the state of an application may be user-specific. The concept of the state change may be expanded to any transactional web application.

The term 'state change' may denote a modification of state information.

The term 'micro-service architecture' may denote an architectural style that structures an application as a collection of loosely coupled services. In a micro-service or micro-services architecture computing environment, services should be fine-grained, and the protocols should be lightweight. The benefit of decomposing an application into different smaller services is that it improves modularity and makes the application easier to understand, develop and test. It may also parallelize development by enabling small autonomous teams to develop, deploy and scale their respective services independently. It may also know the architecture of an individual service to emerge through continuous refactoring. The micro-service architecture may enable continuous delivery and deployment and may thus have advantages over traditional architecture styles.

The term 'client-side state client' may denote a client-side component enabled to support the management of the state of the web application together with a client state store, the browser history and the server-side state micro-service, and related components.

The term 'client state store' may denote a storage unit adapted to store state information—web application state, state identifier and optionally state data—of a web application. It may be a no-SQL JSON database in which the state information is stored. JSON (JavaScript Object Notation) is an open-standard data format that uses human-readable text to transmit data objects consisting of attribute—value pairs. It is the most common data format used for asynchronous browser/server communication, largely replacing XML, and is used by AJAX. Thus, JSON is a language-independent data format. It was derived from JavaScript, but as of 2017 many programming languages include code to generate and parse JSON-format data.

The term 'client user interface component' may typically denote a client-side component used for an interaction between a user using a pointing device and the user interface, i.e., typically a browser.

The term 'navigation' may denote moving the pointer within a browser window using a pointing device by a user.

The term 'server-side micro-service' may denote a micro-service relating to, or being part of, a web application on the server-side.

The term 'state identifier' may denote a unique code instrumental for identifying a specific state of a given application at a specific time for a specific user.

The term 'universal resource locator' (URL) may denote a web address which is a reference to a web resource that may specify its location on a computer network and a mechanism for retrieving it. A URL is a specific type of Uniform Resource Identifier (URI), although many people use the two terms interchangeably. A URL implies the means to access an indicated resource and is denoted by a protocol or an access mechanism, which might not be true of every URI.

The term 'server-side state micro-service' may denote a server-side component in form of a micro-service instrumental for managing state data of any transaction application, e.g., web application.

The term 'state data' may denote context data relating to a specific state of a web application. A typical example may be the content of a shopping cart of a web shop application. It may be noted that the state data may be user and context-specific.

The term 'state validation engine' may denote a server-side component instrumental for validating a state of a web application in time and in context. The state validation engine may collaborate with one or more state validators.

The term 'state validators' may denote a server-side component instrumental for validating a state of a web application together with the state validation engine. State validators may determine the state of the web application under different aspects. Examples for these aspects may be a timeframe, a user context or other environmental conditions (weather, season, class terms, and the like). A more illustrative example is given in the context of the advantages of the proposed system and method above.

The proposed computer-implemented method for controlling a web application state in a micro-service architecture may offer multiple advantages and technical effects:

Web applications and web portal portlets may be supported by a dedicated state management implemented in a dedicated micro-service. Such a solution may be designed for scalability and the state management becomes independent of the concrete web application that makes up a web portal. The characteristic of a loose coupling between the state micro-service and the application may render the proposed approach more versatile than solutions implemented in state-of-the-art web portal software.

Additionally, the managed state might not strictly be bound to a specific user session or the lifetime of a specific web application. Thus, flexibility among web applications and a dynamic usage of the state by various web applications may be facilitated. Eventually, the state may also be shared across users and/or user groups, or another browser on another device may be used without losing the user experience.

From an implementation point of view, the model and the syntax of the managed state might not be dictated by the state micro-service but may use a model defined outside the state micro-service.

As a further advantage of the proposed solution, it may be mentioned that a lifetime management of the state may be easily implementable. Thus, a specific state may only be persisted, as long as related context information may give a reason to remember the specific state.

For example, a user may navigate through a web shop and may search for products, such as specific cloth which may typically be worn at a traditional folk festival. The cloth may be put into the electronic shopping cart of the web shop. This may represent the state information managed by the new state micro-service. Coming back to the same web shop after several days or weeks will show the shopping cart still containing the specific cloth the user once selected. Coming back to the web shop after a longer period of time, e.g., a month, this piece of state information may have been cleared, as it exceeded the lifetime of the state that was configured, e.g., two weeks. This makes complete sense in the time context because the folk festival may be over at that later point in time.

Such a lifetime management for the state in the microservice environment may be implemented using cognitive computing systems assessing the user context in space and time when the web shop may be re-accessed by the user.

A centralized state micro-service may free the web portal management as well as the underlying application to implement its own proprietary state management, making it leaner and focused on its core functionality. Additionally, complex state URL and a related generation have a known disadvantage of having potentially long and complex URLs which may no longer be required.

According to one preferred embodiment of the method, storing the changed state by the server-side state microservice together with a state identifier in a server state store may also comprise storing state data. These may comprise, for example, content data relating to the state and/or a lifetime period for which the state may be valid. The content data may, for example, where the web application is part of a shopping application, be the content of a shopping cart. Thus, full control over the state, as well as state related data, is given without unnecessary overhead.

According to another preferred embodiment of the method, notifying the client user interface component about the changed state also may comprise adding the changed state to the current URL of the web application. This makes the current state bookmarkable because it may be stored in the history file of the browser. Thus, the proposed concept is compatible with traditional session management.

According to an advantageous embodiment of the method, loading a current state via a server-side state micro-service from a server state store may also comprise passing the current state to a state validation engine for a verification of the current state. This may have the advantage that a state may live, as long as the related application is used. The user and/or the system may have complete control about the lifetime of the state. The user may set the lifetime or the validity time of the state, the system may use default values (eventually application type dependent) or, the lifetime may be set automatically based on the context of the application, e.g., seasonality of products in a web shop or the lifetime of a special offer.

According to another advantageous embodiment, the method may further comprise iterating through registered state validators registered with the state validation engine and approving or discarding the current state. The validators may be optimized for different boundary conditions. One may be time based, another one may be context based, i.e., the context of the state potentially in combination with the state data, or the content together with the state. The context may also reflect a plurality of environmental conditions like weather, the seasons, events (e.g., a folk festival, a concert, a football game, an election, student class) and other conditions that may be coded in a computer interpretable way, e.g., by cognitive computing, machine learning or deep learning approaches. One illustrative example has already been discussed in the context of the folk festival above.

According to another embodiment, the method may comprise transmitting the approved or discarded state to the state client via the state validation engine. The transmission may be performed involving the server-side state micro-service such that the same message passing chain is used in both directions: from the client-side to the server side and back. This may avoid chaotic cross communication and thus may enable easier error identification in case a fault occurs.

According to one permissive embodiment, the method may also comprise storing the approved state in its related client state store. With this, the state is readily available on the client-side if a URL is activated indicating the state information may be available on the server side for the related URL. Not any loading of the state from the server may be required.

According to one optional embodiment, the method may also comprise initializing a registered UI (user interface) control—and in particular all UI controls—registered with the client user interface component with the approved state. Thus, a direct access to the state of the related web application may be available. The user may have a seamless user experience.

According to an advantageous embodiment of the method, the loading a current state of the web application via a server-side state micro-service from a server state store may also comprise initializing the state client and the related client state store. This technical feature is useful in order to load the current state from the server state store. The state client may actively control this loading. Thus, an activation or initialization may preferably be implemented.

In the following, a detailed description of the figures will be given. All instructions in the figures are schematic. Firstly, a block diagram of an embodiment of the inventive computer-implemented method for controlling a web application state in a micro-service architecture is given. Afterwards, further embodiments, as well as embodiments of the system for controlling a web application state in a micro-service architecture, will be described.

FIG. 1 shows a block diagram of an embodiment of the computer-implemented method for adaptively controlling a web application state in a micro-service architecture computing environment. The method comprises registering, 102, a client-side state client having a related client state store at a client user interface component, i.e., typically with the client-side browser.

The method comprises further loading, 104, a current state of the web application via a server-side state micro-service from a server state store, if a user navigates in the client user interface component—e.g., the browser—to a website relating to a server-side micro-service of the web application. Generally, the web application may be implemented according to micro-service architecture rules, i.e., the web application is backed by a server-side micro-service architecture. The current state is indicated by a state identifier in a related universal resource locator for the web application.

The method comprises further triggering, 106, a state change of the web application by a user interface control of the client user interface component, e.g., the browser. One example of such a state change may be a user clicking on an item to be purchased and moving it to a shopping cart in a web shop.

Then, the method comprises transmitting, 108, the changed state from the server-side micro-service of the web application to the server-side state micro-service. Here, the state may be managed on behalf of the user and the client-side and the changed state is stored, 110, by the server-side state micro-service together with a state identifier in a server state store.

Furthermore, the method comprises transmitting, 112, the changed state and the state identifier from the server-side state micro-service to the state client on the client side. Here, the client user interface component is notified, 114, about the changed state. Optionally, the changed state may also be stored in the client state store.

FIG. 2 shows a flowchart of an embodiment of a state persisting flow 200. FIG. 2, as well as FIG. 3, show more implementation near flowcharts if compared to FIG. 1.

The state persisting flow may start at 202. Firstly, the user navigates, 204, to a website that is backed by the already mentioned micro-service architecture computing environment. Thus, the web application, as well as the required infrastructure components, are implemented as individual micro-services.

Next, 206, the state client and the related client state store content are loaded and initialized. If there was, e.g., a state identifier reflected in the URL, the user has navigated to, the client side would go ahead and trigger the state loading/validating flow according to FIG. 3. Generally, client-site components are free to read URL path fragments and query parameters in order to establish the initial state if required and/or desired.

Other client-site components may register, 208, themselves with the state client to be notified about state changes in the backend, e.g., the micro-service-based web application.

When the user works with the website he may trigger, 210—via the browser—a state change action via one of the client-side controls. He may, for example, put an item into the shopping cart which may be equivalent to a call against a server-side micro-service.

The server-side micro-service calls, 212, the state micro-service at the server-side to persist the state notification in the server state store along with an identifier for the changed state. Optionally, also additional state data—i.e., context data about the state—may be stored together with the state identifier for future use.

Next, the state micro-service notifies, 214, the client-side state client about the state change/modification—i.e., the changed state—and the related state identifier that has been persistent on the server-side.

In a final step, before the end 216 of this flowchart, and dependent on the state change, the state client may choose to reflect the current state—or a subset of it—in the URL, hence, the web browser history. This may be performed using the HTML 5 history API, and thus makes the modified state bookmarkable by the end-user. This persisting flow 200 ends at block 218.

FIG. 3 shows a flowchart of an embodiment of a state loading/validation flow 300. The second part of the overall workflow describes a validation of a previous state for current use.

The series of activities starts at 302. Also, here, the user navigates, 304, to the website that is backed by the micro-service architecture-based web application. In a next step, 306, the state client and the related state store content are loaded by and into the client user interface component—e.g., the browser—and initialize themselves. Also, here—compare FIG. 2—other client-side components may register, 308, themselves with the state client to be notified about state changes in the backend, i.e., the server-side application.

Then, the state client detects, 310, that the state has been referenced in the web browser URL and triggers loading the state information from the server-side state micro-service. The server-side state micro-service loads, 312 the related state data from the server state store based on the state identifier provided by the state client. The next steps of the flowchart are shown using FIG. 4.

The server-side state micro-service passes, 314, the state information to the state validation engine to verify the stored state. The state may now be approved or discarded/rejected. For this, the state validation engine iterates, 316, through the registered state validators that have been registered with a state validator registry before. The state validators approve or discard, 318, the state information based on various criteria comprising lifetime of the state, user and/or environmental context data, and so on. Consolidated validation results of the state information are then returned, 318, by the state validation engine back to the server-side state micro-service.

From here, the state micro-service notifies, 320, the client-side state client about the validated state. Optionally, the client-side state client may also be notified about the invalidity of the state. The state client may then choose to store, 322, the state information in the local client state store and to initialize, 324, then all registered UI controls that have signed up for the state information with the loaded state. At this point, the loading the state is finished and a user can now interact with a website in a single page application way. This activity flow 300 ends at block 326.

FIG. 5 shows an embodiment 500 of substantial system components involved in executing the proposed method 100. The upper part of FIG. 5 is directed towards client-side components, whereas the lower side of FIG. 5 is directed to server-side components. Although the client-side is shown in form of a web browser window 502 with an input field 504 for, e.g., a URL input, the other client-side components are shown in the browser window; however, this is only for illustrative purposes. Normally, the browser window will display the content relating to the activated URL. The client-side components would nominally not be visible but be active in the background of the client. Several UI controls 506 may be instrumental for an interaction between a user navigating a pointing device over the browser window, i.e., the client user interface component, and the displayed content. The state client 508 has a coordination role between the browser input field 504, the client state store 510 as well as the cookie store or history store 512 of the browser 502. The arrows are drawn according to the message flows according to the flowcharts of the FIGS. 1, 2, 3 and 4.

The user may activate a UI control 506 which may trigger a state change in his server-side web application, here represented by the micro-service 514. It may be noted that the web application may be implemented as a plurality of micro-services 514. As described above, the micro-service 514 is in message exchange contact with the server-side state micro-service 516. The server state micro-service 516 uses the server state store 518 for storing a state of the web application together with a state identifier and potential additional state data.

On the other side, for validation purposes of the state, the server state micro-service 516 is in communicative message exchange with the state validation engine 520 which is using one or more state validators 522 which are registered in a state validator registry. As mentioned above, these state validators may approve or discard the state loaded from the server state store depending on a predefined or dynamic rule or condition, e.g., a defined lifetime of the state and/or user specific context and/or based using insights derived from a cognitive computing system.

It may be noted that the connection from the state client 508 to the server state micro service 516 may be implemented using standard web sockets. Furthermore, the state client 508 may also push URLs from the browser history store to the browser input field 504. Additionally, the client state store may—in some implementations—be a client-side copy of the server's state store 518.

Embodiments of the invention may be implemented together with virtually any type of computer, regardless of the platform being suitable for storing and/or executing program code. FIG. 6 shows, as an example, a computing system 600 suitable for executing program code related to the proposed method.

The computing system 600 is only one example of a suitable computer system and is not intended to suggest any limitation as to the scope of use or functionality of embodiments of the invention described herein. Regardless, computer system 600 is capable of being implemented and/or performing any of the functionality set forth hereinabove. In the computer system 600, there are components, which are operational with numerous other general purposes or special purpose computing system environments or configurations. Examples of well-known computing systems, environments, and/or configurations that may be suitable for use with computer system/server 600 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like. Computer system/server 600 may be described in the general context of computer system-executable instructions, such as program modules, being executed by a computer system 600. Generally, program modules may include routines, programs, objects, components, logic, data structures, and so on that perform particular tasks or implement particular abstract data types. Computer system/server 600 may be practiced in distributed cloud computing environments where tasks are performed by remote processing devices that are linked through a communications network. In a distributed cloud computing environment, program modules may be located in both local and remote computer system storage media including memory storage devices.

As shown in the figure, computer system/server 600 is shown in the form of a general-purpose computing device. The components of computer system/server 600 may include, but are not limited to, one or more processors or processing units 602, a system memory 604, and a bus 606 that couples various system components including system memory 604 to the processor 602. Bus 606 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. Computer system/server 600 typically includes a variety of computer system readable media. Such media may be any available media that is accessible by computer system/server 600, and it includes both, volatile and non-volatile media, removable and non-removable media.

The system memory 604 may include computer system readable media in the form of volatile memory, such as random-access memory (RAM) 608 and/or cache memory 610. Computer system/server 600 may further include other removable/non-removable, volatile/non-volatile computer system storage media. By way of example only, storage system 612 may be provided for reading from and writing to a non-removable, non-volatile magnetic media (not shown and typically called a 'hard drive'). Although not shown, a magnetic disk drive for reading from and writing to a removable, non-volatile magnetic disk (e.g., a 'floppy disk'), and an optical disk drive for reading from or writing to a removable, non-volatile optical disk such as a CD-ROM, DVD-ROM or other optical media may be provided. In such instances, each can be connected to bus 606 by one or more data media interfaces. As will be further depicted and described below, memory 604 may include at least one program product having a set (e.g., at least one) of program modules that are configured to carry out the functions of embodiments of the invention.

The program/utility, having a set (at least one) of program modules 616, may be stored in memory 604 by way of example, and not limitation, as well as an operating system, one or more application programs, other program modules, and program data. Each of the operating system, one or more application programs, other program modules, and program data or some combination thereof, may include an implementation of a networking environment. Program modules 616 generally carry out the functions and/or methodologies of embodiments of the invention as described herein.

The computer system/server 600 may also communicate with one or more external devices 618 such as a keyboard, a pointing device, a display 620, etc.; one or more devices that enable a user to interact with computer system/server 600; and/or any devices (e.g., network card, modem, etc.) that enable computer system/server 600 to communicate with one or more other computing devices. Such communication can occur via Input/output (I/O) interfaces 614. Still yet, computer system/server 600 may communicate with one or more networks such as a local area network (LAN), a general wide area network (WAN), and/or a public network (e.g., the Internet) via network adapter 622. As depicted, network adapter 622 may communicate with the other components of computer system/server 600 via bus 606. It should be understood that although not shown, other hardware and/or software components could be used in conjunction with computer system/server 600. Examples include, but are not limited to: microcode, device drivers, redundant processing units, external disk drive arrays, RAID systems, tape drives, and data archival storage systems, etc.

Additionally, at least portions of the system components of FIG. 5—i.e., the system for controlling a web application state in a micro-service architecture may be attached to the bus system 606.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 7, illustrative cloud computing environment 1000 is depicted. As shown, cloud computing environment 1000 comprises one or more cloud computing nodes 1001 with which local computing devices used by cloud consumers, such as, for example, personal digital assistant (PDA) or cellular telephone 1000A, desktop computer 1000B, laptop computer 1000C, and/or automobile computer system 1000N may communicate. Nodes 1001 may communicate with one another. They may be grouped (not shown) physically or virtually, in one or more networks, such as Private, Community, Public, or Hybrid clouds as described hereinabove, or a combination thereof. This allows cloud computing environment 1000 to offer infrastructure, platforms and/or software as services for which a cloud consumer does not need to maintain resources on a local computing device. It is understood that the types of computing devices 1000A-N shown in FIG. 7 are intended to be illustrative only and that computing nodes 1001 and cloud computing environment 1000 can communicate with any type of computerized device over any type of network and/or network addressable connection (e.g., using a web browser).

Referring now to FIG. 8, a set of functional abstraction layers 1100 provided by cloud computing environment 1000 is shown. It should be understood in advance that the components, layers, and functions shown in FIG. 8 are intended to be illustrative only and embodiments of the invention are not limited thereto. As depicted, the following layers and corresponding functions are provided:

Hardware and software layer 1102 include hardware and software components. Examples of hardware components include: mainframes 1104; RISC (Reduced Instruction Set Computer) architecture-based servers 1106; servers 1108; blade servers 1110; storage devices 1112; and networks and networking components 1114. In some embodiments, software components include network application server software 1116 and database software 1118.

Virtualization layer 1120 provides an abstraction layer from which the following examples of virtual entities may be provided: virtual servers 1122; virtual storage 1124; virtual networks 1126, including virtual private networks; virtual applications and operating systems 1128; and virtual clients 1130.

In one example, management layer 1132 may provide the functions described below. Resource provisioning 1134 provides dynamic procurement of computing resources and other resources that are utilized to perform tasks within the cloud computing environment. Metering and Pricing 1136 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 1138 provides access to the cloud computing environment for consumers and system administrators. Service level management 1140 provides cloud computing resource allocation and management such that required service levels are met. Service Level Agreement (SLA) planning and fulfillment 1142 provide pre-arrangement for, and procurement of, cloud computing resources for which a future requirement is anticipated in accordance with an SLA.

Workloads layer 1144 provides examples of functionality for which the cloud computing environment may be utilized. Examples of workloads and functions which may be provided from this layer include: mapping and navigation 1146; software development and lifecycle management 1148; virtual classroom education delivery 1150; data analytics processing 1152; transaction processing 1154; and state management program 1156. A state management program provides a way to control a web application state in a micro-service architecture.

The descriptions of the various embodiments of the present invention have been presented for purposes of illustration but are not intended to be exhaustive or limited to the embodiments disclosed. Many modifications and variations will be apparent to those of ordinary skills in the art without departing from the scope and spirit of the described embodiments. The terminology used herein was chosen to best explain the principles of the embodiments, the practical application or technical improvement over technologies found in the marketplace, or to enable others of ordinary skills in the art to understand the embodiments disclosed herein.

The present invention may be embodied as a system, a method, and/or a computer program product. The computer program product may include a computer readable storage medium (or media) having computer readable program instructions thereon for causing a processor to carry out aspects of the present invention.

The medium may be an electronic, magnetic, optical, electromagnetic, infrared or a semi-conductor system for a propagation medium. Examples of a computer-readable medium may include a semi-conductor or solid-state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W), DVD and Blu-Ray-Disk.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object-oriented programming language such as Smalltalk, C++ or the like, and conventional procedural programming languages, such as the "C" programming language or similar programming languages. The computer readable program instructions may execute entirely on the user's computer, partly on the user's computer as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus', and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus', or another device to cause a series of operational steps to be performed on the computer, other programmable apparatus or other device to produce a computer implemented process, such that the instructions which execute on the computer, other programmable apparatus', or another device implement the functions/acts specified in the flowchart and/or block diagram block or blocks.

The flowcharts and/or block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or act or carry out combinations of special purpose hardware and computer instructions.

The terminology used herein is for the purpose of describing particular embodiments only and is not intended to limit the invention. As used herein, the singular forms "a", "an" and "the" are intended to include the plural forms as well, unless the context clearly indicates otherwise. It will further be understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or steps plus function elements in the claims below are intended to include any structure, material, or act for performing the function in combination with other claimed elements, as specifically claimed. The description of the present invention has been presented for purposes of illustration and description but is not intended to be exhaustive or limited to the invention in the form disclosed. Many modifications and variations will be apparent to those of ordinary skills in the art without departing from the scope and spirit of the invention. The embodiments are chosen and described in order to best explain the principles of the invention and the practical application, and to enable others of ordinary skills in the art to understand the invention for various embodiments with various modifications, as are suited to the particular use contemplated.

What is claimed is:

1. A method for controlling a web application state in a micro-service architecture, said method comprising:
    navigating in a client user interface component to a website relating to a server-side micro-service of said web application indicated by a state identifier in a related universal resource locator;
    loading a current state of said web application via a server-side state micro-service from a server state store;
    triggering a state change of said web application by a user interface control of said client user interface component;
    transmitting said state change from said server-side micro-service of said web application to said server-side state micro-service;
    managing said state change by said server-side state micro-service together with a state identifier in a server state store;
    transmitting said state change and said state identifier from said server-side state micro-service to said client-side state client; and
    notifying said client user interface component about said state change.

2. The method according to claim 1, wherein managing said state change by said server-side state micro-service together with a state identifier in a server state store further comprises storing a plurality of state data in said server state store.

3. The method according to claim 1, wherein said client user interface component reflects said state change in said related universal resource locator.

4. The method according to claim 1, loading a current state of said web application via a server-side state micro-service from a server state store further comprises passing said current state to a state validation engine for a verification of said current state.

5. The method according to claim 4, further comprising:
iterating through a plurality of registered state validators registered with said state validation engine; and
approving or discarding said current state.

6. The method according to claim 5, further comprising transmitting an approved or discarded state to said client-side state client via said state validation engine.

7. The method according to claim 6, further comprising storing an approved state in its related client state store.

8. The method according to claim 7, further comprising initializing a registered user interface (UI) control registered with said client user interface component with said approved state.

9. The method according to claim 1, wherein loading a current state of said web application via a server-side state micro-service from a server state store further comprises initializing said client-side state client and said related client state store.

10. A computer system for controlling a web application state in a micro-service architecture, comprising:
one or more processors, one or more computer-readable memories, one or more computer-readable tangible storage medium, and program instructions stored on at least one of the one or more tangible storage medium for execution by at least one of the one or more processors via at least one of the one or more memories, wherein the computer system is capable of performing a method comprising:
navigating in a client user interface component to a website relating to a server-side micro-service of said web application indicated by a state identifier in a related universal resource locator;
loading a current state of said web application via a server-side state micro-service from a server state store;
triggering a state change of said web application by a user interface control of said client user interface component;
detecting a state change of said web application by a user interface control of said client user interface component;
transmitting said state change from said server-side micro-service of said web application to said server-side state micro-service;
managing said state change by said server-side state micro-service together with a state identifier in a server state store;
transmitting said state change and said state identifier from said server-side state micro-service to said client-side state client; and
notifying said client user interface component about said state change.

11. The computer system according to claim 10, wherein managing said state change by said server-side state micro-service together with a state identifier in a server state store further comprises storing a plurality of state data in said server state store.

12. The computer system according to claim 10, wherein said client user interface component reflects said state change in said related universal resource locator.

13. The computer system according to claim 10, wherein loading a current state of said web application via a server-side state micro-service from a server state store further comprises passing said current state to a state validation engine for a verification of said current state.

14. The computer system according to claim 13, further comprising:
iterating through a plurality of registered state validators registered with said state validation engine; and
approving or discarding said current state.

15. The computer system according to claim 14, further comprising transmitting an approved or discarded state to said client-side state client via said state validation engine.

16. The computer system according to claim 15, further comprising storing an approved state in its related client state store.

17. The computer system according to claim 16, further comprising initializing a registered user interface (UI) control registered with said client user interface component with said approved state.

18. The computer system according to claim 10, wherein loading a current state of said web application via a server-side state micro-service from a server state store further comprises initializing said client-side state client and said related client state store.

19. A computer program product for controlling a web application state in a micro-service architecture, comprising:
one or more computer-readable storage media and program instructions stored on at least one of the one or more tangible storage media, the program instructions executable by a processor to cause the processor to perform a method comprising:
navigating in a client user interface component to a website relating to a server-side micro-service of said web application indicated by a state identifier in a related universal resource locator;
loading a current state of said web application via a server-side state micro-service from a server state store;
triggering a state change of said web application by a user interface control of said client user interface component;
transmitting said state change from said server-side micro-service of said web application to said server-side state micro-service;
managing said state change by said server-side state micro-service together with a state identifier in a server state store;
transmitting said state change and said state identifier from said server-side state micro-service to said client-side state client; and
notifying said client user interface component about said state change.

20. The computer program according to claim 19, wherein managing said state change by said server-side state micro-service together with a state identifier in a server state store further comprises storing a plurality of state data in said server state store.

* * * * *